United States Patent [19]

Rossana et al.

[11] Patent Number: 5,577,144
[45] Date of Patent: Nov. 19, 1996

[54] FIBER OPTIC CONNECTOR

[75] Inventors: Michael D. Rossana, Harrisburg; David D. Erdman, Hummelstown, both of Pa.

[73] Assignee: The Whitaker Corporation, Wilmington, Del.

[21] Appl. No.: 453,432

[22] Filed: May 30, 1995

[51] Int. Cl.⁶ ..................................................... G02B 6/36
[52] U.S. Cl. .................. 385/78; 385/60; 385/76
[58] Field of Search ................................. 385/75–78, 81, 385/60, 62

[56] References Cited

U.S. PATENT DOCUMENTS

| | | | |
|---|---|---|---|
| Re. 31,515 | 2/1984 | Heldt | 350/96.21 |
| 3,790,791 | 2/1974 | Anderson | 250/227 |
| 4,413,880 | 11/1983 | Forrest et al. | 350/96.20 |
| 4,418,983 | 12/1983 | Bowen et al. | 350/96.21 |
| 4,477,146 | 10/1984 | Bowen et al. | 350/96.21 |
| 4,553,814 | 11/1985 | Bahl et al. | 350/96.21 |
| 4,603,465 | 8/1986 | Bretti et al. | 29/564.6 |
| 4,699,456 | 10/1987 | Mackenzie | 350/96.20 |
| 4,699,462 | 10/1987 | Jones | 350/96.23 |
| 4,776,740 | 10/1988 | Holton | 411/521 |
| 4,790,622 | 12/1988 | Levinson et al. | 350/96.20 |
| 4,810,053 | 3/1989 | Woith | 350/96.20 |
| 4,812,006 | 3/1989 | Osborn et al. | 350/96.21 |
| 4,813,760 | 3/1989 | Tanaka et al. | 350/96.21 |
| 4,818,057 | 4/1989 | Bruch | 350/96.20 |
| 4,832,435 | 5/1989 | Suzuki et al. | 350/96.20 |
| 4,834,603 | 5/1989 | Holton | 411/521 |
| 4,836,637 | 6/1989 | Poorman et al. | 350/96.21 |
| 4,930,856 | 6/1990 | Pelta | 350/96.2 |
| 4,998,796 | 3/1991 | Bonanni et al. | 350/96.21 |
| 5,018,822 | 5/1991 | Freismuth et al. | 350/96.20 |
| 5,052,774 | 10/1991 | Bulman et al. | 385/86 |
| 5,058,985 | 10/1991 | Davenport et al. | 385/115 |
| 5,067,733 | 11/1991 | Nagai et al. | 277/11 |
| 5,073,044 | 12/1991 | Egner et al. | 385/86 |
| 5,121,455 | 6/1992 | Palecek | 385/69 |
| 5,142,600 | 8/1992 | Ortiz, Jr. | 385/83 |
| 5,142,601 | 8/1992 | Shibata et al. | 385/86 |
| 5,185,837 | 2/1993 | Ayuta et al. | 385/81 |
| 5,193,099 | 3/1993 | Chou | 372/107 |
| 5,208,887 | 5/1993 | Ginderslev | 385/81 |
| 5,222,176 | 6/1993 | Webber et al. | 385/99 |
| 5,241,611 | 8/1993 | Gould | 385/70 |
| 5,245,683 | 9/1993 | Belenkiy et al. | 385/72 |
| 5,253,315 | 10/1993 | Fentress | 385/78 |
| 5,257,333 | 10/1993 | Nodfelt | 385/64 |
| 5,271,080 | 12/1993 | Hopper et al. | 385/76 |
| 5,276,752 | 1/1994 | Gugelmeyer et al. | 385/69 |
| 5,436,995 | 7/1995 | Yoshizawa et al. | 385/86 |
| 5,524,159 | 6/1996 | Turgeon et al. | 385/60 |

FOREIGN PATENT DOCUMENTS

0624810A2  11/1994  European Pat. Off. .

Primary Examiner—Rodney B. Bovernick
Assistant Examiner—Yisun Song

[57] ABSTRACT

A tubular body for use with an optical fiber connector, and the connector using such a tubular body. The optical fiber connector includes a coupling nut with an aperture formed therein, a spring and a retainer which are axially arranged on the tubular body. The coupling nut and the spring are retained externally on the tubular body by the retainer with the coupling nut being movable along the outside surface of the body and axially displaced by the spring. The body includes a retainer attachment portion on the outside surface thereof. The retainer attachment portion includes an annular groove and an annular ridge which are formed on the outside surface thereof. The annular groove is sized and dimensioned for receiving a radially applied retainer. The outside diameter of the attachment portion on the outside surface of the body is sized and dimensioned for receiving an axially attached retainer. One wall of the annular groove includes a sloped surface which prevents the spring from being caught in the annular groove and between the outside surface of the tubular body and the aperture of the coupling nut.

19 Claims, 8 Drawing Sheets

FIBER OPTIC CONNECTOR

BACKGROUND

The invention relates to optical fiber connectors. More particularly the present invention relates to a multiple component optical fiber connector which reduces assembly errors and defects.

Optical fiber connectors are extremely important to make critical mechanical connections between the free ends of optical fibers. It is important that the connectors securely retain the connection between the two pieces of optical fiber. A variety of connectors have been developed to provide such connection. For example, U.S. Pat. No. 5,073,044 to Egner et al., issued Dec. 17, 1991, assigned to the Assignee of the present invention, shows an optical fiber connector having a right angle strain relief.

The general design of the Egner device is representative of optical fiber connectors. Such a connector includes a tubular body including a ferrule, a coupling nut, biasing means and a retaining ring. The coupling nut and biasing means are axially arranged on the tubular body and retained in position by the retaining ring. The biasing means acts against the coupling nut to provide a secure engagement with the other coupling component with which it is connected.

Typically, the retaining ring used with this type of connector is a C-ring having an open gap along one side for radial attachment to the tubular body. The C-ring is mated with an annular groove formed on an outside surface of the body. U.S. Pat. No. 5,121,455 to Palecek, issued Jun. 9, 1992, is an example of a C-ring used to retain a coupling nut and spring on the body of an optical fiber connector.

It would be desirable to provide an optical fiber connector which could be assembled using automated procedures. The C-ring retaining ring due to its radial assembly is not conducive to reliable automated assembly. However, the C-ring retaining ring, or other manual attachment procedures may be a necessary fallback assembly technique in the event of downtime of an automated assembly machine. It is important to provide the ability to use both manual and automated assembly techniques in order to maintain the required level of production output for the optical connectors.

A problem which may occur during the assembly of an optical fiber connector is that the biasing means or spring may become trapped or lodged between the coupling nut and the elongated body. The connector is assembled by axially aligning and telescopically stacking the coiled spring and coupling nut on the elongated body. This problem may occur in connectors which use an elongated body having an annular groove for accepting C-rings. During the assembly process, the spring is positioned on the elongated body and the coupling nut is positioned over the spring and the elongated body. As the spring is compressed along the elongated body by the downward movement of the coupling nut, the spring may shift with a trailing end coil of the spring shifting into the annular groove in the elongated body. Continued downward movement of the coupling nut may wedge or trap the trailing end coil in the groove resulting in a defectively assembled connector.

OBJECTS AND SUMMARY

A general object satisfied by the present invention is to provide a tubular body for use with an optical fiber connector which can be assembled using an automated assembly apparatus.

Another object satisfied by the present invention is to provide a tubular body for use with an optical fiber connector which is capable of using a radially attached retaining ring or an axially attached retaining ring to secure a nut and biasing means in association with the tubular body.

Yet another object satisfied by the present invention is an elongated body structure which prevents a spring of the assembly from being improperly assembled thereby reducing the number of defective assemblies.

Still another object satisfied by the present invention is to provide an optical fiber connector which has increased manufacturability due to the structure of the tubular body which accommodates attachment of a retaining ring in a radial direction or an axial direction.

Briefly, and in accordance with the foregoing, the present invention envisions a tubular body for use with an optical fiber connector, and the connector using such a tubular body. The optical fiber connector includes a coupling nut with an aperture formed therein, a spring and a retainer which are axially arranged on the tubular body. The coupling nut and the spring are retained externally on the tubular body by the retainer with the coupling nut being movable along the outside surface of the body and axially displaced by the spring. The body includes a retainer attachment portion on the outside surface thereof. The retainer attachment portion includes an annular groove and an annular ridge which are formed on the outside surface thereof. The annular groove is sized and dimensioned for receiving a radially applied retainer. The outside diameter of the attachment portion on the outside surface of the body is sized and dimensioned for receiving an axially attached retainer. One wall of the annular groove includes a sloped surface which prevents the spring from being caught in the annular groove and between the outside surface of the tubular body and the aperture of the coupling nut.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

Figure 1:
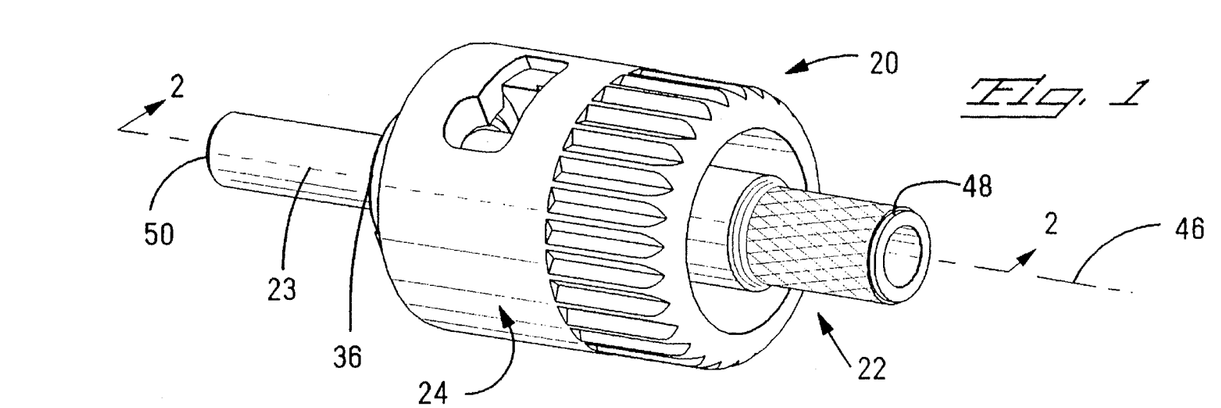
FIG. 1 is a perspective view of an optical fiber connector having a tubular body including a ferrule and a coupling nut.

With reference to FIG. 1, a multiple component article 20 is shown in a perspective view. In particular, the multiple component article is an optical fiber connector 20 having a tubular body 22, a ferrule 23 connected to the tubular body 22 and a coupling nut 24. For purposes of description and explanation of the process and apparatus of the present invention, the optical fiber connector 20 is used as an example of a multiple component article. It should be noted that the present description is not intended to be limited to optical fiber connectors but should include other multiple component articles.

Figure 2:
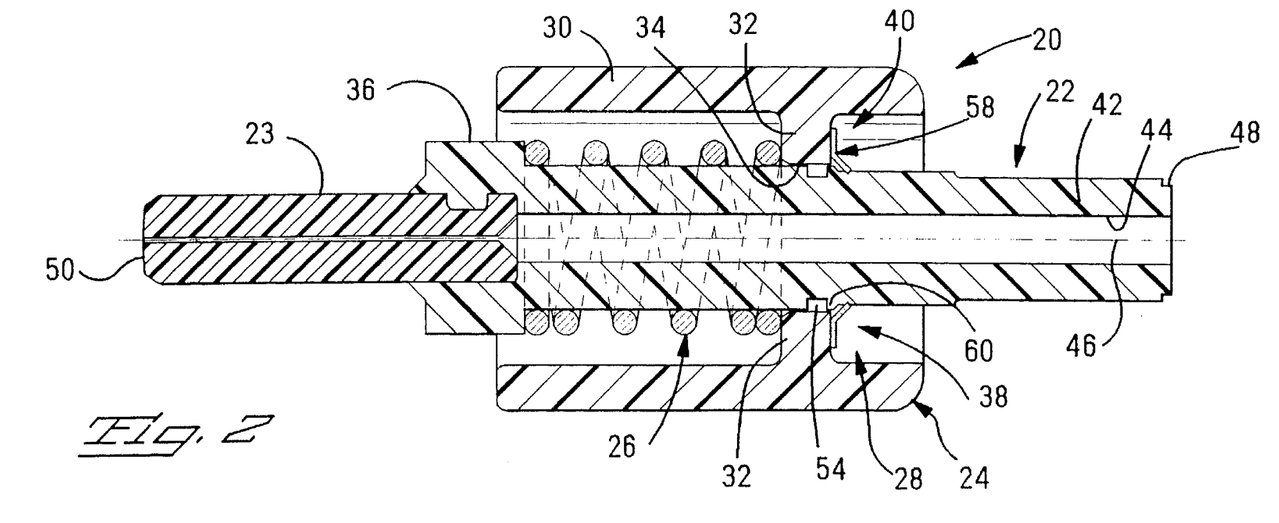
FIG. 2 is a cross-sectional side elevational view taken along line 2—2 in FIG. 1 of the optical fiber connector with the tubular body, the ferrule, the coupling nut, biasing means and a retaining ring axially arranged on the tubular body with the coupling nut and the biasing means being retained on the tubular body by the retaining ring.

FIG. 2 shows the optical fiber connector 20 in cross-section to further illustrate the arrangement of the tubular body 22 and coupling nut 24 and showing biasing means 26 and retaining means 28 of the connector 20 which are not shown in the perspective view of FIG. 1. Preferably, the tubular body 22 is formed of plastic material which is overmolded on the ferrule 23. Alternatively, the tubular body 22 and the ferrule 23 can be integrally molded or machined out of metal. For purposes of this description, the combination of the tubular body 22 and the ferrule 23 will be referred to as the elongated body 27. The coupling nut 24 has a generally cylindrical nut body or wall 30 with transverse inwardly projecting inner flanges 32 which define a bore 34. The tubular body 22 extends through the bore 34 with the biasing means 26 retained between the flanges 32 and a shoulder 36 formed on the tubular body 22.

The coupling nut 24 and biasing means 26 are retained on the tubular body 22 with the biasing means 26 retained in compression by the retaining means 28. The retaining means 28 includes a retaining means attachment zone or ring attachment portion 38 formed on an outside surface of the tubular body 22 and a coupling nut retaining means 40 mounted on the tubular body 22 in the retaining means attachment zone 38. The retaining means attachment zone 38 is configured to accommodate a retaining ring which is either radially attached as well as a retaining ring which is axially attached to the tubular body 22. It should be noted that it is generally expected that a radially attached retaining ring and an axially attached retaining ring will be used independently and not applied to the same body.

The tubular body 22 includes a wall 42 which defines a central elongated lumen 44. A central axis 46 extends coaxially through the lumen 44 along the direction of elongation of the tubular body 22. One end of the tubular body 22 defines an optical fiber entry end 48 with the opposite end of the tubular body 22 mating with the ferrule 23 defining an optical fiber connecting end 50. An optical fiber (not shown) placed in the connector 20 extends through the entry end 48 of the tubular body, through the lumen 44, through the ferrule 23 and through the connecting end 50. The ferrule 23 precisely aligns the optical fiber with a corresponding fiber retained in a mating connector ferrule (not shown).

Figure 5:
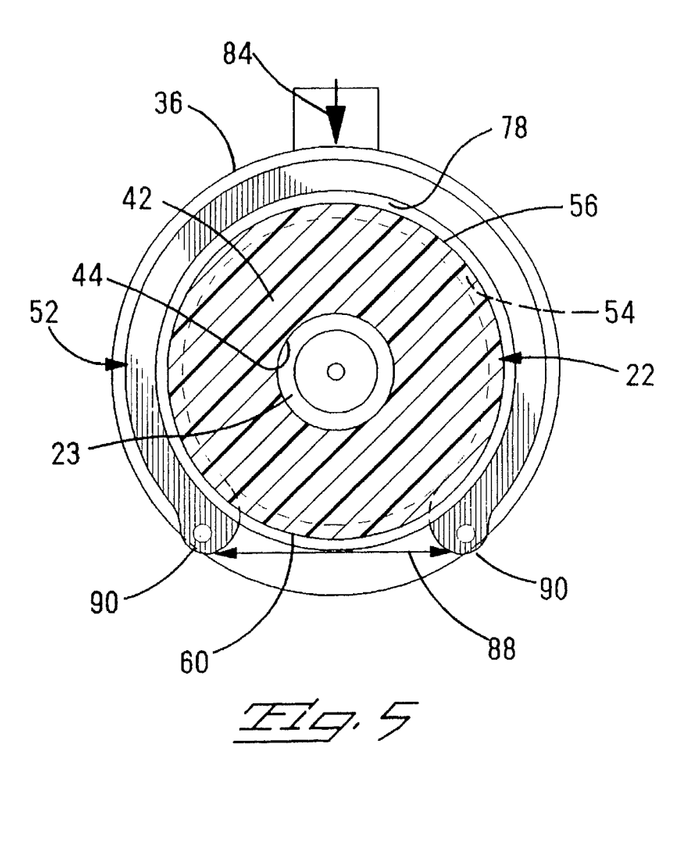
FIG. 5 is a cross-sectional end view taken along line 5—5 in FIG. 3 of the tubular body and on which a C-ring has been applied to the annular groove formed on an outside surface of the tubular body.
Figure 6:
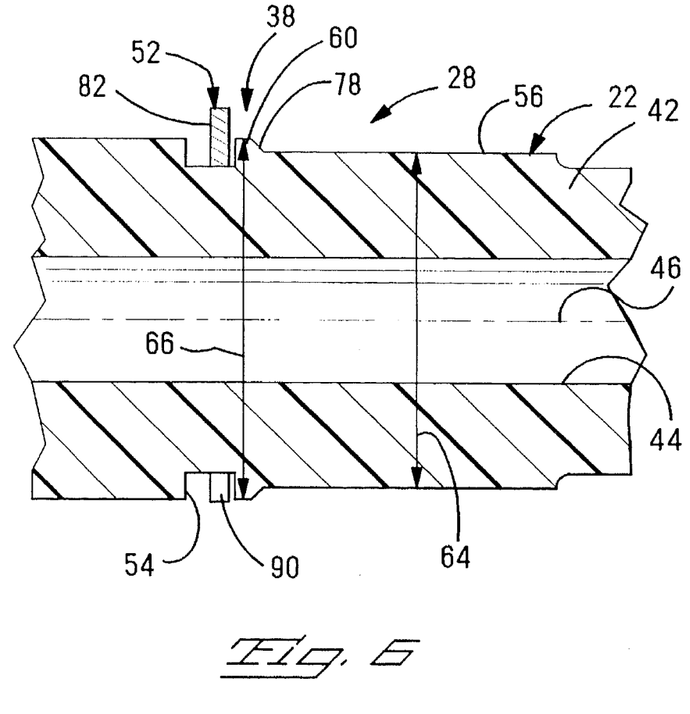
FIG. 6 is a partial fragmentary, cross-sectional, side elevational view taken along line 6—6 in FIG. 3 showing the C-ring retained in the annular groove.

As mentioned above, and with further reference to FIG. 3, the tubular body 22 includes a retaining means attachment zone or retainer attachment zone 38. The retaining means attachment zone 38 accommodates either a radially attached retaining ring or an axially attached retaining ring. An example of a radially attached retaining ring is shown in FIG. 5 and 6 by a C-ring 52 which is engaged in an annular groove 54 formed on an outside surface 56 of the wall 42 of the tubular body. An example of an axially attached retaining ring is the continuous annular retaining ring or retaining ring 58 shown in FIGS. 7 and 8. The retaining ring 58 is axially positioned over the outside surface 56 of the tubular body 22 in close spacing next to an annular ridge 60 which radially projects from the wall 42 of the tubular body 22.

Figure 8:
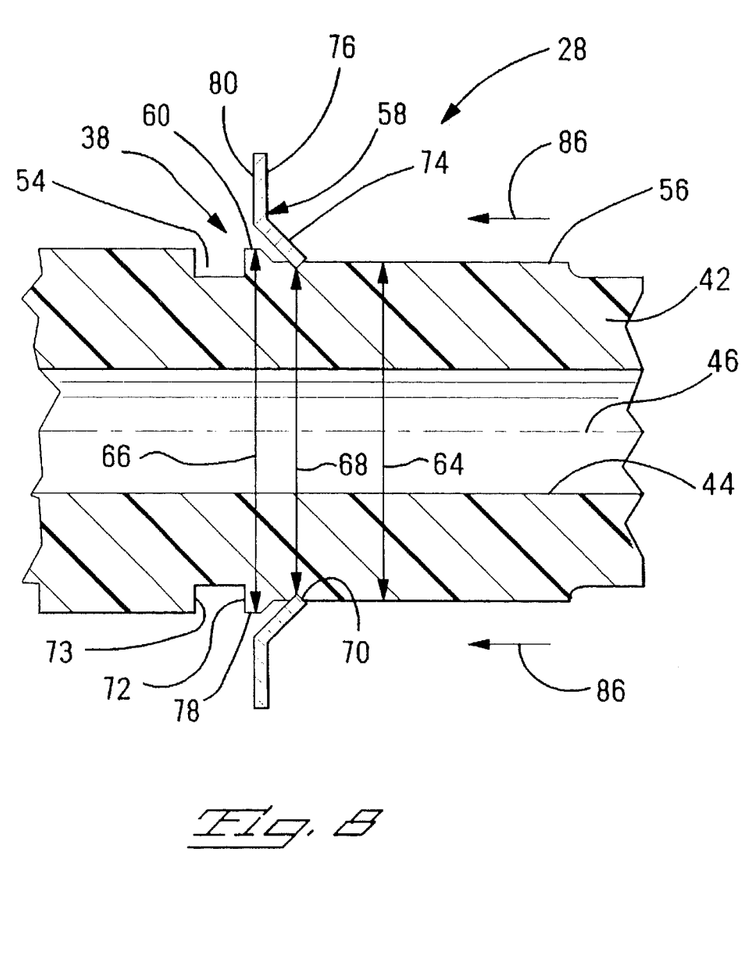
FIG. 8 is a partial fragmentary, cross-sectional, side elevational view taken along line 8—8 in FIG. 3 showing the retaining ring engaged with the tubular body and abutting the annular ridge formed between the annular groove and the optical fiber entry end.

As can be seen more clearly in the enlarged partial fragmentary, cross-sectional, side elevational views of FIGS. 6 and 8, the retaining means attachment zone 38 on the tubular body 22 includes both the annular groove 54 and the annular ridge 60. The annular groove and annular ridge 54, 60 are positioned on the tubular body towards the fiber entry end 48. As shown in FIGS. 6 and 8, the annular ridge 60 is formed between the groove 54 and the entry end 48. The position of the annular ridge 60 provides positive locating of the retaining ring 58 and generally limits the axial placement of such a retaining ring 58.

With further reference to FIGS. 6 and 8, it can be seen that the first diameter 64 of the tubular body is less than a second diameter 66 of the tubular body 22 measured between the outside surfaces of the annular ridge 60. The difference between the diameters 64, 66 allows the retaining ring 58 to be positively positioned and engaged on the outside surface 56 of the wall 42 in an area of the retaining means attachment zone 38 having a diameter generally equal to the first diameter 64.

It should also be noted, that the inside diameter 68 of the retaining ring 58 shown in the figures is slightly smaller than the first outside diameter 64 of the tubular body 22. This is so that there is a friction fit between an inside edge 70 of the retaining ring 58 and the first outside surface 56 of the wall 42. In fact, when the retaining ring 58 is attached to the tubular body the inside edge 70 tends to scuff or scive the outside surface 56 which increases the frictional fit between the retaining ring and the tubular body. Additionally, the retaining means attachment zone 38 may be formed with the annular ridge 60 forming one wall 72 of the walls 72, 73 defining the annular groove 54. This feature allows different types of retaining rings, either radially attached or axially attached, to be positioned in approximately the same location with very little axial difference between the two different types of rings.

With regard to the retaining ring 58 as shown in FIGS. 2 and 7–10, the retaining ring 58 includes an inner rim portion 74 and an outer flange portion 76. The inner rim portion 74 is formed at an angle relative to the central axis 46. The annular ridge 60 is formed with an approximately corresponding chamfer 78. The angle or offset structure created by the angled inner rim portion 74 of the retaining ring 58 helps to minimize the axial differential distance between the surfaces 80 on the friction fitting ring and a corresponding surface 82 on the C-ring, which surfaces are abutted by the inner flange 32 of the nut 30. By minimizing the axial differential distance between the surfaces 80, 82, the biased location of the nut 30 is almost identical regardless of the type of coupling nut retaining means 40 which is used.

In use, the C-ring 52 is attached in a radial direction (as indicated by arrow 84 in FIG. 5) whereas the retaining ring 58 is attached in an axial direction (as shown by direction arrow 86 in FIG. 8). The C-ring 52 is positioned into the groove 54 by positioning the C-ring 52 in alignment with the annular groove 54 of the tubular body 22 between a gap 88 defined between opposed open ends 90 of the C-ring 52. The C-ring 52 is pressed towards the annular groove 54 so that the opposed ends 90 deflect, momentarily, slightly outwardly to allow the body to pass therebetween whereupon the C-ring engages the groove.

The retaining ring 58, on the other hand, being a solid circular ring, is conducive to automated application in the axial direction 86. The tubular body 22 is oriented to project through an aperture 68 defined between the inside edge 70 of the inner rim portion 74 of the retaining ring 58. A force is applied to the retaining ring 58 in the axial direction 86.

With reference to FIGS. 4 and 9–16, the elements of the structure which are identical to those as shown in FIGS. 1–3 and 5–8 are identified with the same reference numeral whereas alternate forms of the structure are shown with a corresponding reference numeral with the addition of an alphabetic suffix.

Figures 3, 4:
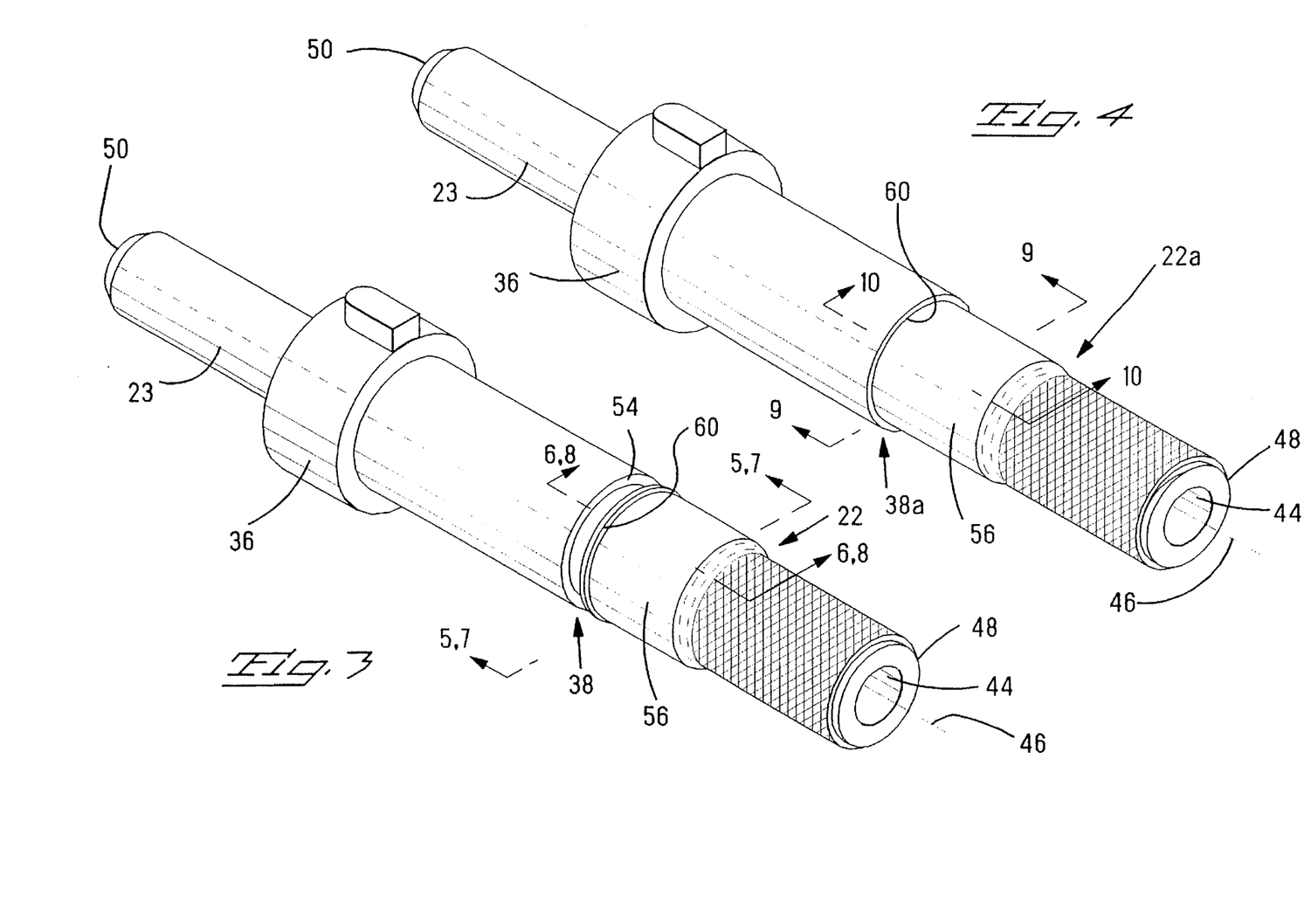
FIG. 3 is a perspective view of the tubular body and ferrule having an intermediate annular groove and an annular ridge on the outside surface of the tubular body as viewed from the end through which an optical fiber enters the tubular body.
FIG. 4 is a perspective view of the tubular body and ferrule having only an annular ridge on the outside surface of the tubular body as viewed from the end through which an optical fiber enters the tubular body.
Figure 7:
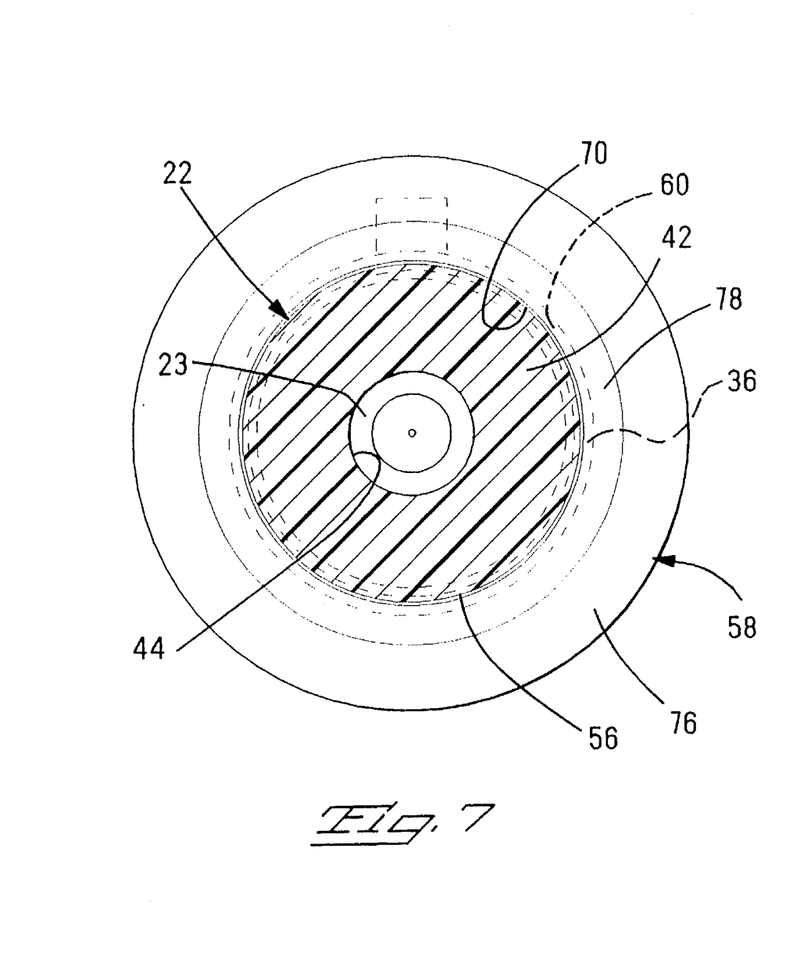
FIG. 7 is a cross-sectional end view taken along line 7—7 in FIG. 3 and in which a retaining ring has been axially applied to an outside surface of the tubular body.
Figure 9:
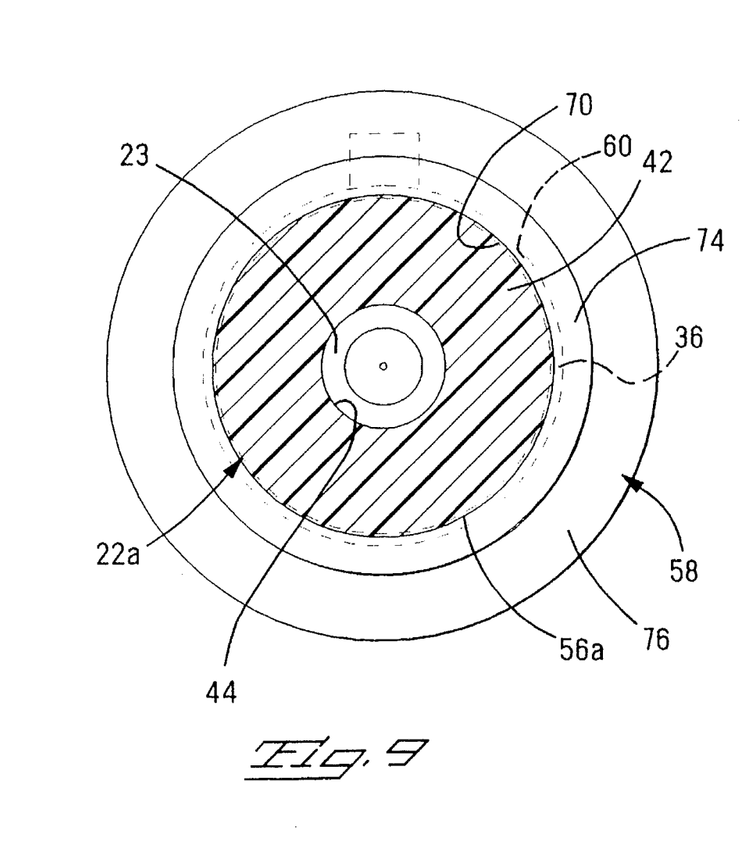
FIG. 9 is a cross-sectional end view taken along line 9—9 in FIG. 4 and in which a retaining ring has been applied to an outside surface of the tubular body.
Figure 10:
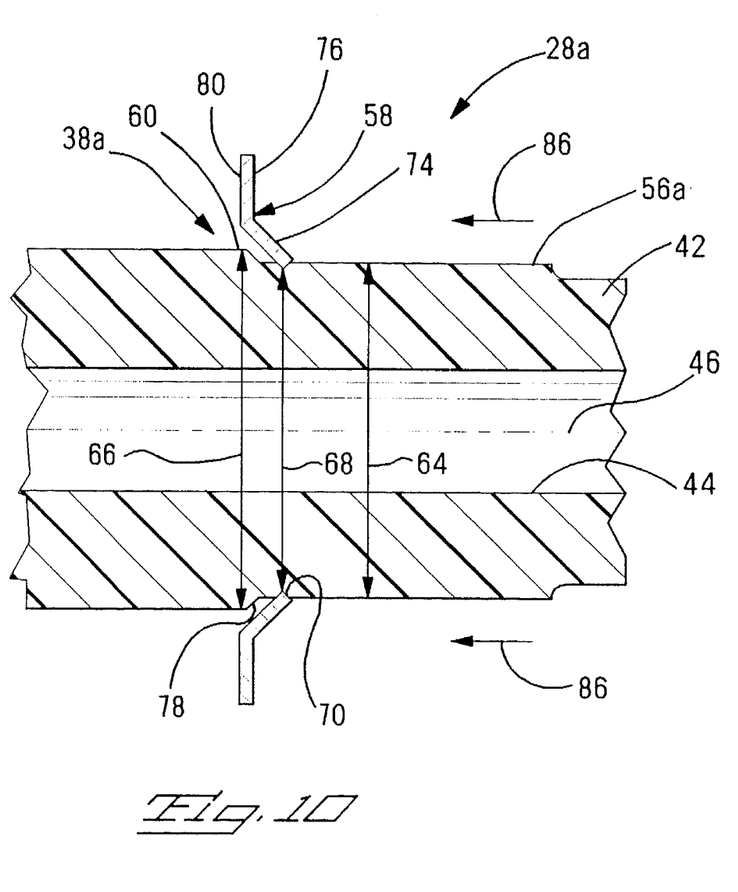
FIG. 10 is a partial fragmentary, cross-sectional, side elevational view taken along line 10—10 in FIG. 4 showing the retaining ring engaged with the tubular body and abutting the annular ridge formed on the outside surface of the tubular body.

As shown in FIGS. 4, 9 and 10, the tubular body 22a includes a retaining means attachment zone 38a. The retaining means attachment zone 38a does not accommodate a radially attached retaining ring and only accommodates an axially attached retaining ring. The axially attached retaining ring 58 is the solid annular friction fitting retaining ring 58 as shown in FIGS. 7 and 8. The retaining ring is axially positioned over the outside surface 56 of the tubular body 22a in close spacing next to the ridge 60. The ridge 60 as shown in FIGS. 4, 9 and 10 is an increased diameter portion of the body 22a as will be described in greater detail hereinbelow. The retaining means attachment zone 38a on the tubular body 22a is positioned towards the entry end 48 and includes the ridge 60.

A first diameter 64 of the tubular body 22a is less than a second diameter 66 of the tubular body 22a measured between the outside surfaces of the ridge 60. The inside diameter 68 of the retaining ring 58 is slightly smaller than the first outside diameter 64 of the tubular body 22a. The dimensional difference between the inside diameter 68 of the retaining ring 58 and the outside diameter of the tubular body 22a provides a friction fit between an inside edge 70 of the retaining ring 58 and the outside surface of the wall 42. When the retaining ring 58 is attached to the tubular body the inside edge 70 tends to scuff or scive the outside surface 56 which increases the frictional fit between the retaining ring and tubular body. The differences between the diameters 64, 66 allows the retaining ring 58 to be positively positioned and engaged on the outside surface 56 of the wall 42 in the retaining means attachment zone 38a.

The elongated body 27b as shown in FIGS. 11–18 includes a retaining means attachment zone 38b on the tubular body 22b. The retaining means attachment zone 38b accommodates either a radially attached retainer or retaining ring or an axially attached retainer or retaining ring. The axially attached retaining ring 58 is the solid annular friction fitting retaining ring 58 as shown in FIGS. 7 and 8 and the radially attached retaining ring is the C-ring 52 as shown in FIGS. 5 and 6. The retaining means attachment zone 38b on the tubular body 22b is positioned towards the entry end 48 and includes the ridge 60.

Figures 13, 15:
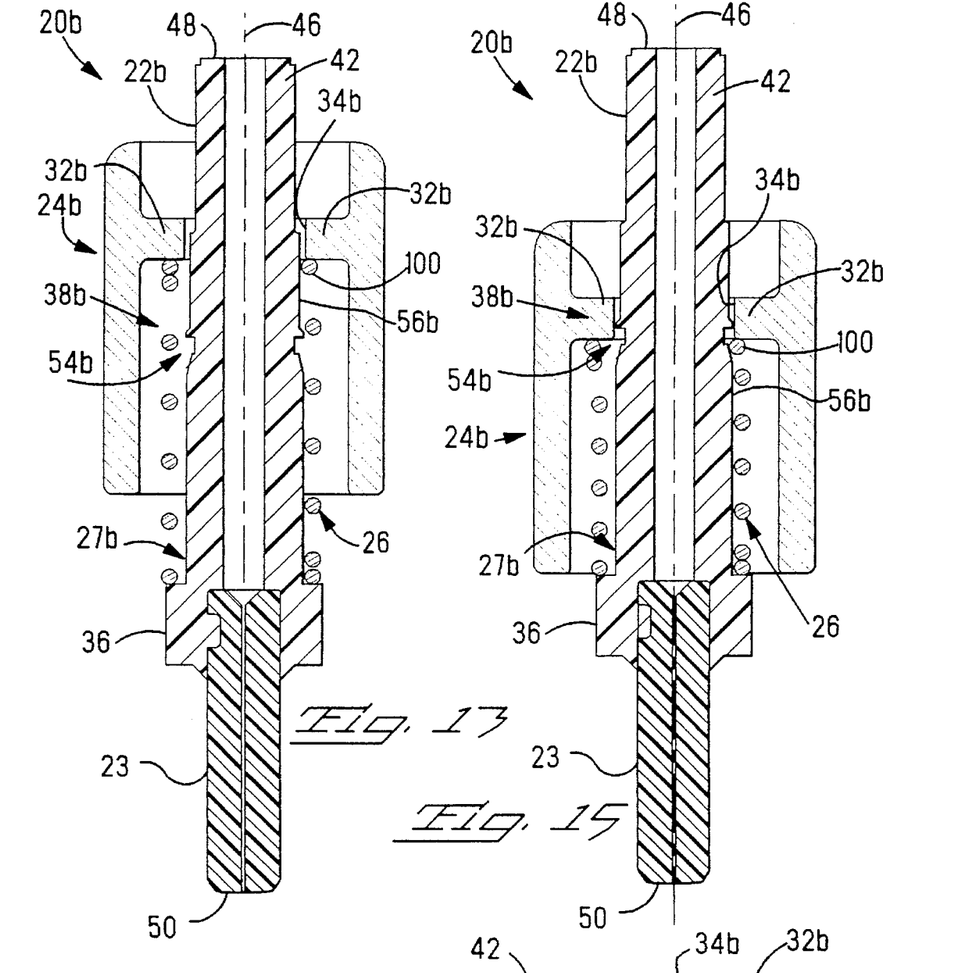
FIG. 13 is a cross-sectional, side elevational view similar to that shown in FIG. 2 illustrating the alternate embodiment of the retainer attachment zone and in which the biasing means has not been compressed along the tubular body by the coupling nut and in which a retainer has not been attached to the tubular body.
FIG. 15 is a cross-sectional, side elevational view similar to the view as shown in FIG. 13 in which the coupling nut has been displaced along the central axis of the tubular body to partially compress the biasing means with a trailing end coil of the biasing means positioned in the retainer attachment zone.
Figure 14:
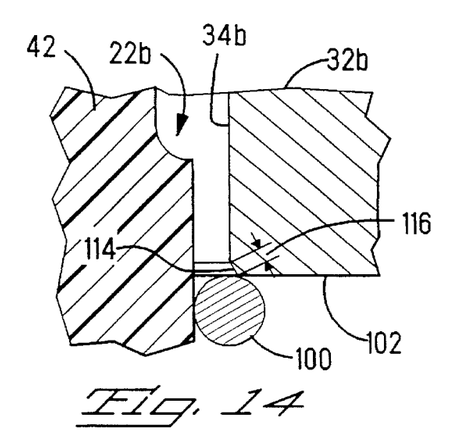
FIG. 14 is an enlarged cross-sectional, side elevational view of the area near the retainer attachment zone of FIG. 13 showing a trailing coil positioned against a surface of a radially extending flange of the coupling nut and an outside surface of the tubular body.
Figure 16:
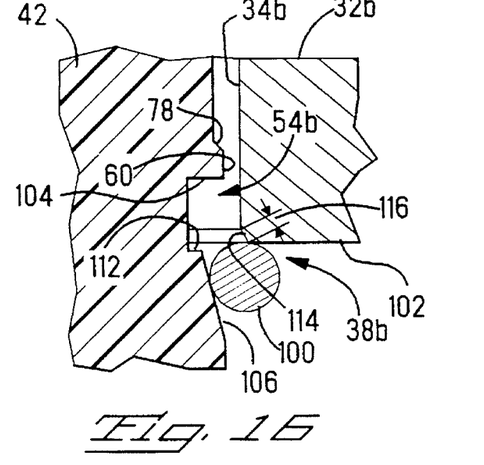
FIG. 16 is an enlarged cross-sectional, side elevational view of the retainer attachment zone of FIG. 15 showing in greater detail the trailing end coil of the biasing means positioned in the retainer attachment zone being positioned against a surface of the radially, inwardly extending flange of the coupling nut and a sloped surface of the retainer attachment zone.
Figures 17, 18:
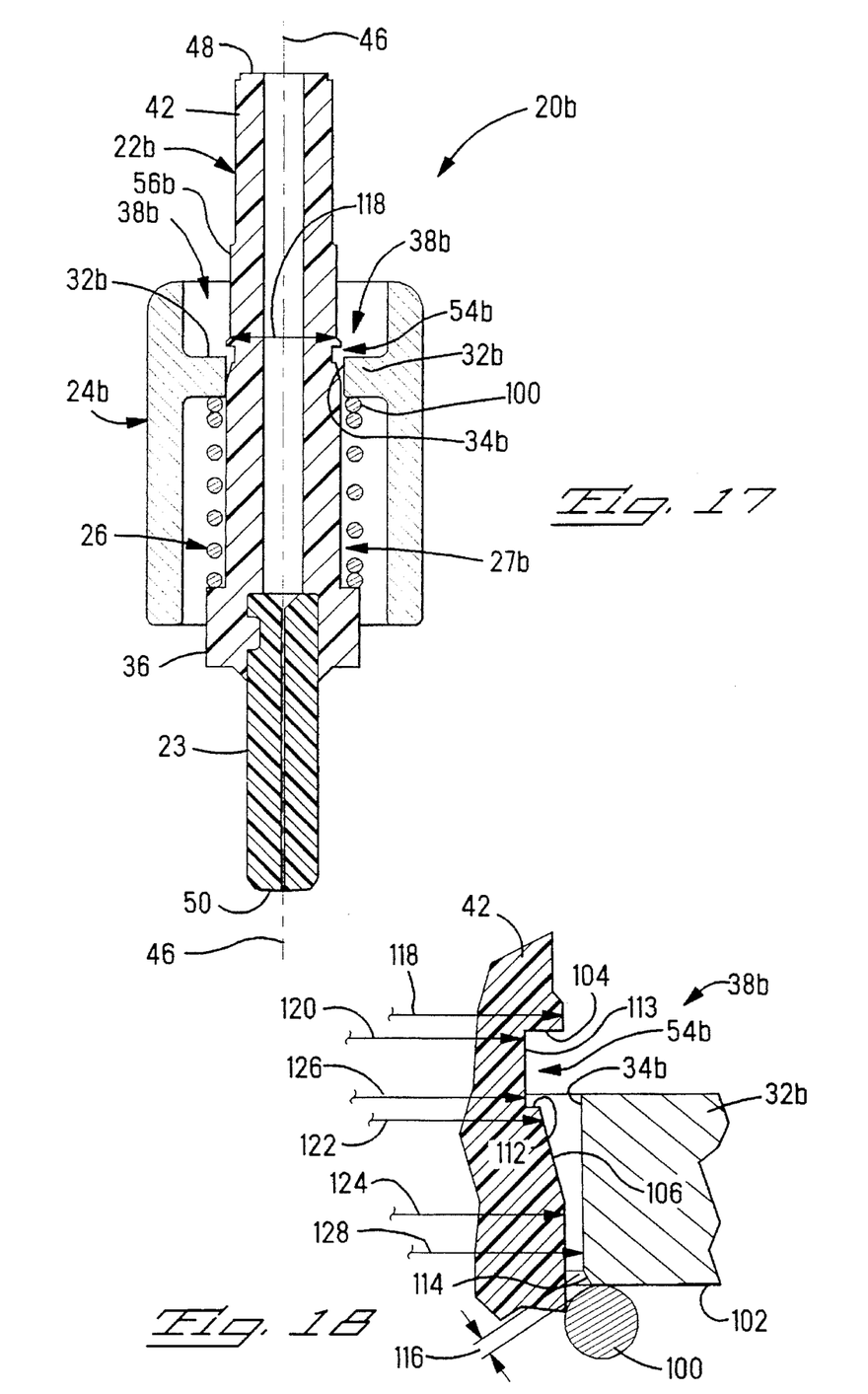
FIG. 17 is a cross-sectional, side elevational view similar to that as shown in FIGS. 13 and 15 in which the coupling nut has been displaced along the central axis to sufficiently compress the biasing means for exposing the retainer attachment zone for attachment of a retainer thereon.
FIG. 18 is an enlarged cross-sectional, side elevational view of the retainer attachment zone as shown in FIG. 17 in which the trailing end coil of the compressed biasing means as shown in FIG. 17 is positioned against a surface of the radially inwardly projecting flange of the coupling nut and against the outside surface of the tubular body.

An alternate embodiment of the present invention is shown in FIGS. 11–18. In this embodiment, the retainer attachment zone 38b is configured for accepting a retainer on the tubular body 22b and preventing the biasing means 26 from being caught between the outside surface of 56b of the tubular body 22b and an inside surface of the aperture 34b of the coupling nut 24b. FIGS. 13, 15 and 17 show a tubular body 22b with biasing means 26 positioned thereon and a coupling nut 24b positioned for compressing the biasing means against the shoulder 36. FIGS. 13, 15 and 17 provide progressive views showing the biasing means 26 in advancing stages of compression between the coupling nut 24 and tubular body 22b. The enlarged views as shown in FIGS. 14, 16 and 18 (corresponding to FIGS. 13, 15 and 17, respectively) show enlarged views of a trailing coil 100 of the biasing means 26 which abuts a surface 102 of the flange 32b of the coupling nut 24b and an outside surface 56b of the tubular body 22b in the area surrounding the retainer attachment zone 38b and in the retainer attachment zone 38b.

Figures 11, 12:
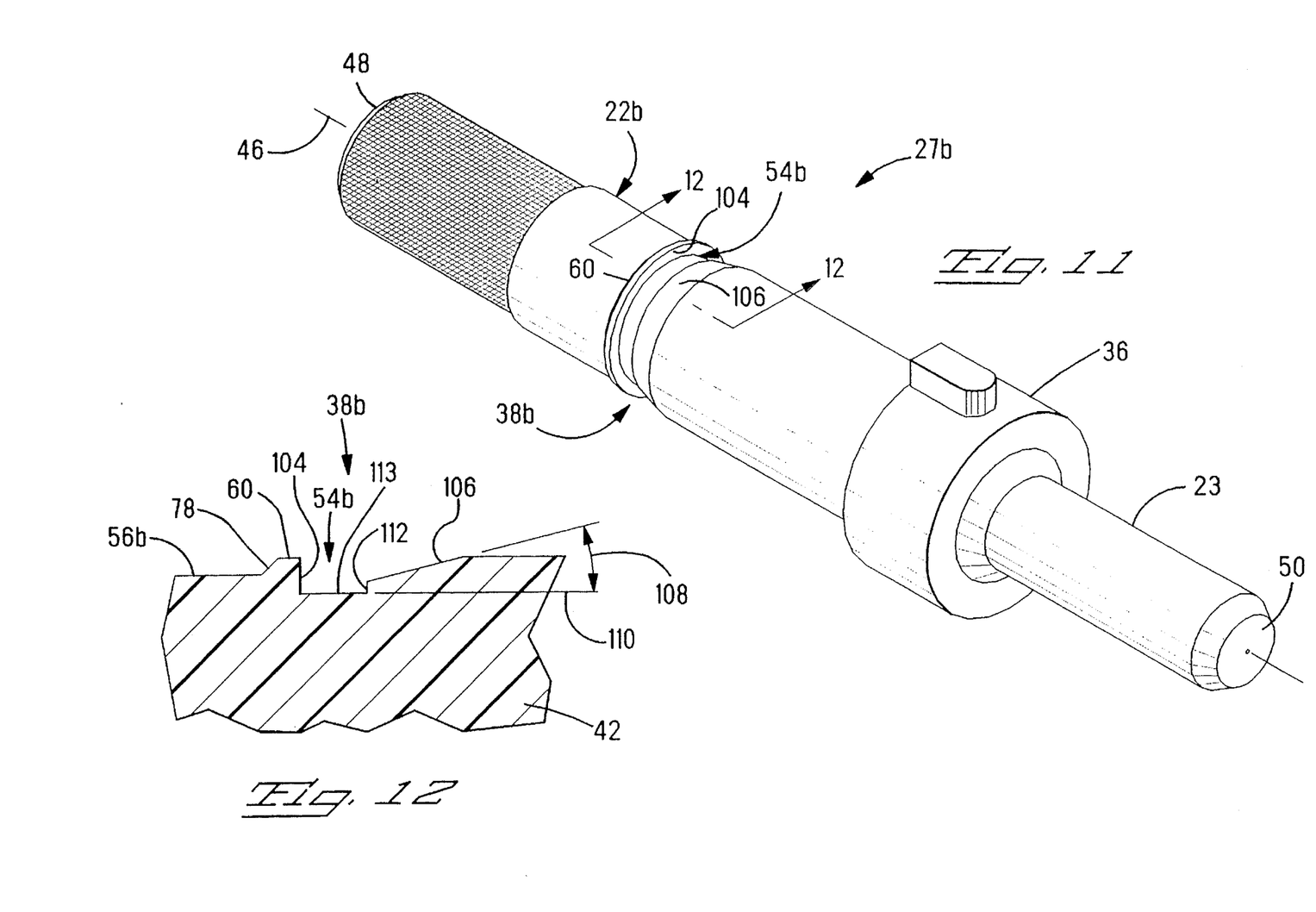
FIG. 11 is a perspective view of the tubular body and ferrule having an alternate embodiment of a retainer attachment zone located on the outside surface of the tubular body as viewed from an optical fiber connecting end.
FIG. 12 is an enlarged, cross-sectional, side elevational view taken along line 12—12 in FIG. 11 showing the structure of the retainer attachment zone.

With reference to FIGS. 11 and 12, the retainer attachment zone 38b includes a first wall 104 and a second wall 106 formed in the outside surface 56b of the tubular body 22b. The first and second walls 104, 106 define the annular groove 54b. The retainer attachment zone 38b including the annular groove 54b is intermediately positioned along the tubular body 22b generally in a plane perpendicularly oriented relative to the central axis 46. The first wall 104 is spaced from the optical fiber entry end 48 with the second wall 106 being positioned between the first wall 104 and the optical fiber connecting end 50. As shown in the enlarged cross-sectional view of FIG. 12, the second wall 106 is a sloped surface spaced in close proximity to and generally facing the first wall 104. An angle 108 is formed between the sloped surface 106 and a reference 110 which is substantially parallel to the central axis 46.

With reference to the description provided hereinabove, an annular ridge 60 is provided in the retaining means attachment zone 38b with one wall of the ridge 60 being formed by the first wall 104. An opposite surface or chamfer 78 of the ridge 60 is angled. The ridge 60 is positioned on the tubular body 22b to limit the axial travel of an axially attached retaining ring. It should be noted that the ridge 60 is not used as a stop for the axially attached retaining ring in all assemblies. Rather, the ridge limits the travel of an axially attached ring which otherwise might be positioned too far away from the fiber optic entry end as the result of changes in component tolerances or the operating tolerances of apparatus which automatically attach axially attached retaining rings.

The retaining attachment zone 38b may also be configured to include a third wall or ledge 112 positioned between the sloped surface 106 and the first wall 104 oriented generally perpendicular to the central axis 46. The ledge 112 provides a retaining surface in the annular groove 54b for positioning a C-ring retained in the annular groove 54b to prevent movement of the C-ring towards the optical fiber connector end 50 and away from the first wall 104. The ledge 112 projects generally perpendicularly away from a face 113 of the annular groove 54b which extends between the first wall 104 and the ledge 112. The ledge 112 projects from the face 113, a dimension which is sufficient to retain the C-ring but not impede movement of a trailing end coil 100 through the groove 54b.

Turning now to FIGS. 13–18 for a more detailed discussion of the problem found in prior art devices and the solution provided by the present invention. FIG. 13 shows the initial steps of assembly of the optical fiber connector 20b in which the biasing means 26, shown here as coiled spring, is axially aligned and positioned over the tubular body 22b and positioned against the shoulder 36. The coupling nut 24b is positioned with the tubular body 22b extending through the aperture 34b and with the flanges 32b positioned on the trailing coil 100 of the spring 26.

Next, as shown in FIG. 15, the coupling nut 24b must be positioned downwardly along the central axis 46 to expose the retainer attachment zone 38b so that a retainer may be positioned on the tubular body 22b thereby retaining the assembly in a final configuration. During the step as shown in FIG. 15, the spring 26 is compressed between the flanges 32 and the shoulder 36. While being compressed, the spring may move relative to the central axis 46 such that the trailing end coil 100 shifts into the annular groove 54b.

When the spring shifts in prior art assemblies, oftentimes it may be trapped in the annular groove between the surfaces defining the groove and the inside surface of the aperture of the coupling nut. This was a problem of some concern since the lodging of the spring in the groove results in a defective assembly. It is important to minimize the defects in the interest of saving time, money and materials during both the assembly and inspection stages as well as preventing defective parts from entering the marketplace. The present invention includes the sloped surface 106 which prevents the trailing end 100 of the spring 26 from being lodged in the annular groove 54b.

The trailing end coil 100 slides over the chamfer 78 of the annular ridge 60 and then may shift inwardly into the annular groove 54b along the first face 104. A leading edge 114 of the flange 32 is formed as a beveled surface having a width dimension 116 which is small enough so as to continue to maintain contact with the trailing end coil 100 thereby continuing to urge the coil downwardly towards the sloped surface 106. As shown in the enlarged view of FIG. 16, the present invention prevents a trailing end coil 100 which shifts into the annular groove 54b from being trapped between the tubular body 22b and the coupling nut 24b. The present invention promotes the movement of the spring 26, particularly the trailing end coil 100 thereof, along the outside surface 56b of the tubular body 22b.

When a trailing end coil 100 shifts into the groove 54b during spring compression, the trailing end coil 100 is moved out of the groove upon continued downward movement of the coupling nut 24b. The continued downward movement or compression of the spring 26 results in the trailing end coil 100 being forced downwardly and out of the downward side of the annular groove 54b along the sloped surface 106. Since the sloped surface 106 generally merges with the outside surface 56b of the tubular body 22b, the trailing end coil 100 travels out of the groove 54b without being caught between the outside surface 56b of the tubular body 22b and the aperture 34b in the coupling nut 24b. The ledge 112 is sized and dimensioned so as to provide the benefits of retaining a C-ring in the annular groove 54b without interfering with the movement of a trailing end coil 100 out of the annular groove 54b.

As shown in FIGS. 17 and 18 continued downward movement of the coupling nut 24b results in exposing the retainer attachment zone 38b for attachment of a retainer thereto, either an axially attachment retainer or a radially attached retainer. As shown in FIG. 18, continued downward movement of the flange 32b continues to force the trailing end coil 100 out of the annular groove 54b preventing the trailing end coil 100 from being lodged therein.

In defining the retainer attachment zone 38b as claimed in the present invention, it is important to understand the nature of the sloped surface 106 as discussed hereinabove and to further understand the general principles. In this regard, further description of the retainer attachment zone 38b is provided with reference to FIGS. 17 and 18 which describe the pertinent surfaces by way of diameters relative to the tubular body 22b. In the description of FIG. 18, it should be understood that the described diameters define dimensions which extend across the tubular body 22b in a plane generally perpendicular to the central axis 46.

Generally, the first wall 104 and the sloped surface 106 formed in the wall 42 of the tubular body define the annular groove 54b. The wall 42 has a first diameter 118 in an area between the optical fiber entry end 48 and the retainer attachment portion 38b. The retainer attachment portion 38b has a second, third and fourth diameter 120, 122, 124, respectively. The second diameter 120 being measured along the tubular body 22b spaced from the first diameter 118 towards the optical fiber connecting end 50. The second diameter 120 is smaller than the first diameter 118. The third diameter 122 is spaced from the second diameter 120 towards the optical fiber connecting end 50 with the third diameter 122 being equal to or greater than the second diameter 120. The fourth diameter 124 is spaced from the third diameter 122 towards an optical fiber connecting end 50 and has a dimension which is greater than the dimension of the third diameter 122. The area between the third diameter 122 and fourth diameter 124 generally defines the sloped surface 106.

Defining the retainer attachment zone 38b in this manner helps to show the breadth of the present invention based only on generally required diametric relationships of the surfaces and not the actual final topography of the retainer attachment zone 38b. In this regard, the sloped surface 106 may be a generally linear slope as well as a slope having an arcuate surface or any other feature which helps to promote the continued movement of the trailing end coil 100 of the spring 26 out of the annular groove 54b so as to prevent it from being trapped therein.

It should also be noted that the annular groove 54b may be configured to include a fifth diameter 126 which is spaced between the second diameter 120 and the third diameter 122. The fifth diameter 126 is greater than or equal to the second diameter 120 but is also less than or equal to the third diameter 122. In this regard, the fifth diameter 126 defines the ledge 112 in the annular groove 54b where the fifth diameter 126 is less than the third diameter 122, and the second diameter 120 is less than or equal to the fifth diameter 126. In a configuration where a ledge 112 is not required, the second diameter 120, third diameter 122, and fifth diameter 126 are all equal, resulting in a sloped surface 106 without a ledge 112 between the sloped surface 106 and the first wall 104. As an additional matter, while defining structures by way of diameters, it should be understood that the aperture 34b has an internal diameter 128 which is greater than all of the first-fifth diameters, 118–126, respectively, defining the retainer attachment zone 38b so as to allow the nut body 24b to be moveable along the tubular body 22b relative to the retainer attachment zone 38b.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. An optical fiber connector comprising:

an axially elongated ferrule connected to and communicating with a tubular body, said tubular body defining a central elongated lumen and a central axis extending therethrough, said tubular body having an optical fiber entry end and said ferrule having an optical fiber connecting end;

a coupling nut operatively associated with said tubular body, said coupling nut having an aperture formed therein for receiving said tubular body extending therethrough, said coupling nut being moveable along said central axis relative to said tubular body;

biasing means positioned between said tubular body and said coupling nut;

a retainer attached to said tubular body and abutting said coupling nut for retaining said biasing means between said coupling nut and said tubular body; and a retainer attachment zone located on an outside surface of said tubular body between said optical fiber entry end and said optical fiber connecting end said retainer attachment zone further including a first and second wall formed in said outside surface of tubular body defining an annular groove, said first wall being spaced from said optical fiber entry end and said second wall being positioned between said first wall and said optical fiber connecting end and spaced in close proximity to and generally facing said first wall, said second wall being sloped relative to said central axis.

2. An optical fiber connector as recited in claim 1, said retainer attachment zone further including an annular ridge formed on said outside surface of said tubular body, said annular ridge being positioned between said first wall of said annular groove and said optical fiber entry end of said tubular body.

3. An optical fiber connector as recited in claim 1, said tubular body further comprising a radially extending shoulder formed on said outside surface of said tubular body between said retainer attachment zone and said optical fiber connecting end of said ferrule, said shoulder being sized and dimensioned for abutting a leading end of said biasing means to prevent movement of said biasing means along said outside surface of said tubular body toward said optical fiber connecting end.

4. An optical fiber connector as recited in claim 3, said biasing means is a coiled spring retained in compression between said coupling nut and said radially extending shoulder.

5. An optical fiber connector as recited in claim 1, wherein said coupling nut includes a beveled edge which abuts a trailing end of said biasing means for promoting movement of said biasing means along said outside surface of said tubular body.

6. A tubular body for use with an optical fiber connector having a coupling nut, biasing means and a retainer carried on said tubular body, said coupling nut and biasing means being retained on said tubular body by said retainer and said coupling nut being moveable along said tubular body and axially displaceable by said biasing means, said tubular body comprising:

a primary wall defining a central elongated lumen;

a central axis extending through said lumen;

one end of said tubular body defining an optical fiber entry end and an opposite end thereof defining an optical fiber connecting end;

a retainer attachment portion of said tubular body positioned on an outside surface of said primary wall for providing an attachment site for said retainer, said outside surface of said primary wall including a first wall and a second wall formed therein defining an annular groove in said retainer attachment portion, said first wall being spaced from said optical fiber entry end and said second wall being positioned between said first wall and said optical fiber connecting end and spaced in close proximity to and generally facing said first wall, said second wall being sloped relative to said central axis.

7. A tubular body as recited in claim 6, further comprising an annular ridge formed on said outside surface of said tubular body, said annular ridge being spaced between said first wall and said optical fiber entry end in close proximity to said first wall.

8. A tubular body as recited in claim 6, wherein said second wall defines a frustum portion of said tubular body.

9. A tubular body as recited in claim 8, wherein said second wall having a generally linear slope formed at an angle relative to said central axis defining a frustoconical section of said tubular body.

10. A tubular body for use with an optical fiber connector having a coupling nut, biasing means and a retainer carried on said tubular body, said coupling nut and biasing means being retained on said tubular body by said retainer and said coupling nut being moveable along said tubular body and axially displaceable by said biasing means, said tubular body comprising:

a primary wall defining a central elongated lumen;

a central axis extending through said lumen;

one end of said tubular body defining an optical fiber entry end and an opposite end thereof defining an optical fiber connecting end;

a retainer attachment portion of said tubular body positioned on an outside surface of said primary wall for providing an attachment site for said retainer, said outside surface of said primary wall including a first wall and a second wall formed therein defining an annular groove in said retainer attachment portion, said primary wall having a first diameter in an area between said optical fiber entry end and said retainer attachment portion;

said retainer attachment portion having a second, third, and fourth diameter through said tubular body generally perpendicularly to said central axis, said second diameter being measured along said tubular body spaced from said first diameter towards said optical fiber connecting end, said second diameter being smaller than said first diameter;

said third diameter being spaced from said second diameter towards said optical fiber connecting end, said third diameter being greater than or equal to said second diameter;

said fourth diameter being spaced from said third diameter towards said optical fiber connecting end, said fourth diameter being greater than said third diameter; and an area of the retainer attachment portion between said third and fourth diameters defining a sloped surface.

11. A tubular body as recited in claim 10, further comprising an annular ridge formed on said outside surface of said tubular body, said annular ridge defining said first diameter.

12. A tubular body as recited in claim 10, wherein said second, third, and fourth diameters define an annular groove formed in the outside surface of said tubular body.

13. A tubular body as recited in claim 12, further comprising a first wall of said annular groove being defined by said first and second diameters.

14. A tubular body as recited in claim 12, wherein said third and fourth dimensions define a second wall, said second wall being angled relative to said central axis.

15. A tubular body as recited in claim 10, said retainer attachment portion further defining a fifth diameter, said fifth diameter being spaced between said second diameter and third diameter wherein said fifth diameter is greater than or equal to said second diameter and said fifth diameter is less than or equal to said third diameter.

16. A multiple component article comprising:

a first body having a longitudinal axis and an annular groove defined by a first and second wall transverse to the longitudinal axis;

a second body having an aperture therethrough arranged with said first body positioned in said aperture;

biasing means positioned between said first body and said second body;

a retainer attached to said first body for retaining said biasing means between said first body and said second body; and a sloped surface formed on the second wall of said first body for preventing said biasing means from being caught between said outside surface of said first body and a corresponding rim of said aperture of said second body.

17. A multiple component article as recited in claim 16, wherein said biasing means is a coiled spring having a trailing end coil, said coiled spring being generally coaxially positioned on said elongated body, said trailing end coil of said coiled spring being positioned proximate to said aperture in said coupling nut, whereby when a portion of said trailing end coil is positioned against said outside surface of said elongated body and a surface defining said aperture, said trailing end coil moves against said sloped surface for preventing the coiled spring from being lodged between the outside surface of the first body and the inside surface of the second body.

18. A multiple component article as recited in claim 16, wherein said retainer is a C-ring and said sloped surface forms one wall of an annular groove formed in the outside surface of said first body, said C-ring retaining said second body in position along said first body with biasing means compressed between said first body and said second body and acting on said second body against said C-ring.

19. A multiple component article as recited in claim 18, further comprising a ledge formed in said annular groove along an inwardly most disposed portion of said sloped surface for limiting movement of said C-ring relative to said sloped surface.

* * * * *